US012580940B2

(12) United States Patent
Bansal et al.

(10) Patent No.: US 12,580,940 B2
(45) Date of Patent: Mar. 17, 2026

(54) SECURITY ASSESSMENT OF SERVICES BEING MIGRATED TO A CLOUD PLATFORM

(71) Applicant: Salesforce, Inc., San Francisco, CA (US)

(72) Inventors: Kaushal Bansal, Pleasanton, CA (US); Prabhat Singh, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 203 days.

(21) Appl. No.: 18/104,056

(22) Filed: Jan. 31, 2023

(65) Prior Publication Data
US 2024/0259415 A1      Aug. 1, 2024

(51) Int. Cl.
*H04L 9/40*        (2022.01)
*G06N 3/08*        (2023.01)

(52) U.S. Cl.
CPC .......... *H04L 63/1433* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2020/0110600 A1* | 4/2020 | Weldemariam | .......... G06N 3/04 |
| 2020/0128047 A1* | 4/2020 | Biswas | .................. H04L 67/10 |
| 2020/0153855 A1* | 5/2020 | Kirti | ...................... H04L 63/20 |
| 2021/0286611 A1* | 9/2021 | Garvey | ................ G06F 9/5055 |
| 2022/0131900 A1* | 4/2022 | Karin | .................... G06N 20/00 |
| 2024/0314169 A1* | 9/2024 | Azad | .................. H04L 63/1491 |

* cited by examiner

*Primary Examiner* — Philip J Chea
*Assistant Examiner* — James Ross Hollister
(74) *Attorney, Agent, or Firm* — Sterne, Kessler, Goldstein & Fox P.L.L.C.

(57) ABSTRACT

A system performs security assessment of services, for example, services being migrated from first party datacenters to virtual datacenters configured on a cloud platform. The system receives information describing risk profiles of services. The system performs clustering of the services and uses the clusters of services for determining security assessment categories for new services. The system may train a machine learning model and use the trained machine learning model for predicting security assessment of new services. The system may recommend actions to be taken based on the security assessment or automatically take action, for example, configuring a firewall for a service.

20 Claims, 8 Drawing Sheets

400

Receiving information describing services
410

Extract features describing services to
obtain feature vectors
420

Determine clusters of feature vectors of
services, each cluster associated with a
security assessment category
430

Store metadata associating clusters of
service features with security assessment
category
440

500

Receiving information describing a new
service S
510

Extract features describing the service S to
obtain feature vector F for service
520

Compare feature vector F with clusters of
services
530

Identify matching cluster for feature vector
F
540

Use security assessment category of
matching cluster for service S
550

600

Receive training data comprising mapping
of services and security assessment scores
610

Extract features describing services to
obtain feature vectors
620

Initialize parameters of machine learning
model
630

Train machine learning model using
training data to adjust parameters
640

Store parameters of trained machine
learning model
650

700

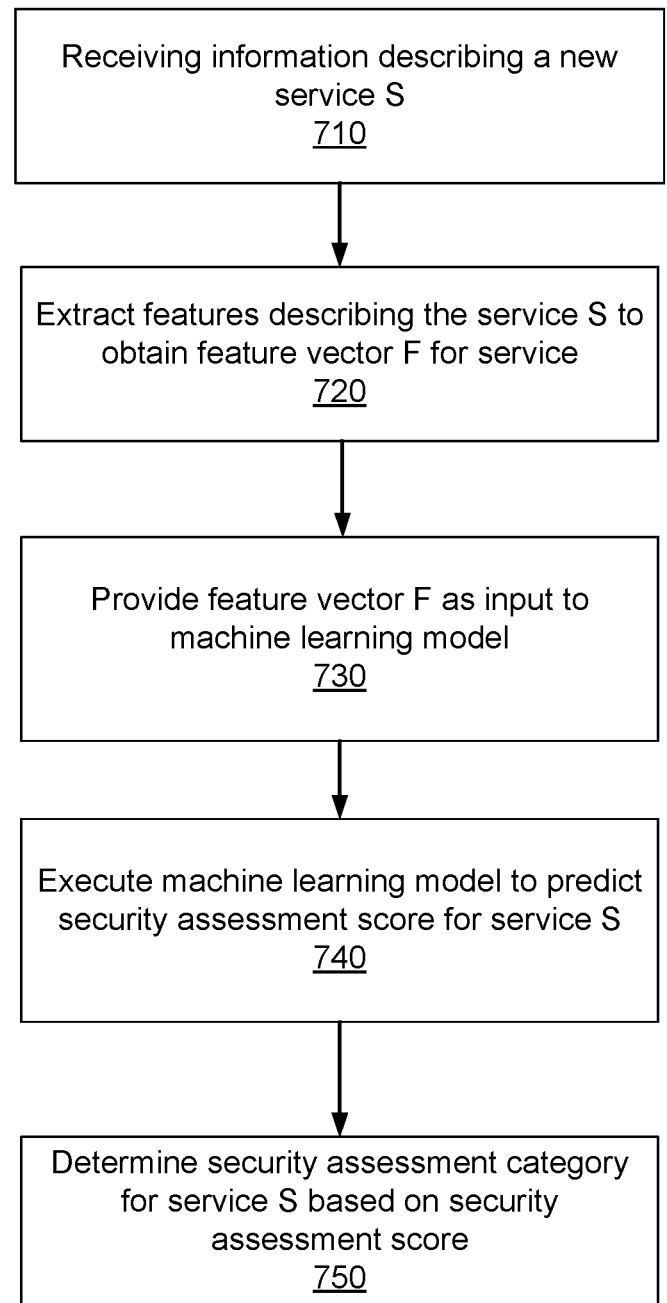

Receiving information describing a new service S
710

Extract features describing the service S to obtain feature vector F for service
720

Provide feature vector F as input to machine learning model
730

Execute machine learning model to predict security assessment score for service S
740

Determine security assessment category for service S based on security assessment score
750

FIG. 7

SECURITY ASSESSMENT OF SERVICES BEING MIGRATED TO A CLOUD PLATFORM

BACKGROUND

Field of Art

This disclosure relates in general to migration of services from first party datacenters to a cloud platform, and in particular to risk profile assessment of services running in a particular environment, for example, on cloud computing platforms.

Description of the Related Art

Organizations are increasingly replying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Conventionally, organizations maintain data centers that house hardware and software used by the organization. However, maintaining data centers can result in significant overhead in terms of maintenance, personnel, and so on. As a result, organizations are shifting their data centers to cloud platforms that provide scalability and elasticity of computing resources. A large system such as a multi-tenant system may manage services for a large number of organizations representing tenants of the multi-tenant system and may interact with multiple cloud platforms. Migrating to a public cloud platform increases the likelihood of risk exposure of the services compared to first party datacenters. Evaluating the risk exposure of the services being migrated can be a cumbersome and error prone procedure. For a large system such as a multi-tenant system, managing risk exposure of services can be a complex task.

BRIEF DESCRIPTION OF DRAWINGS

FIG. 7 shows a flowchart illustrating the process of determining security assessment for a service based on machine learning models according to an embodiment.

Figure 1:
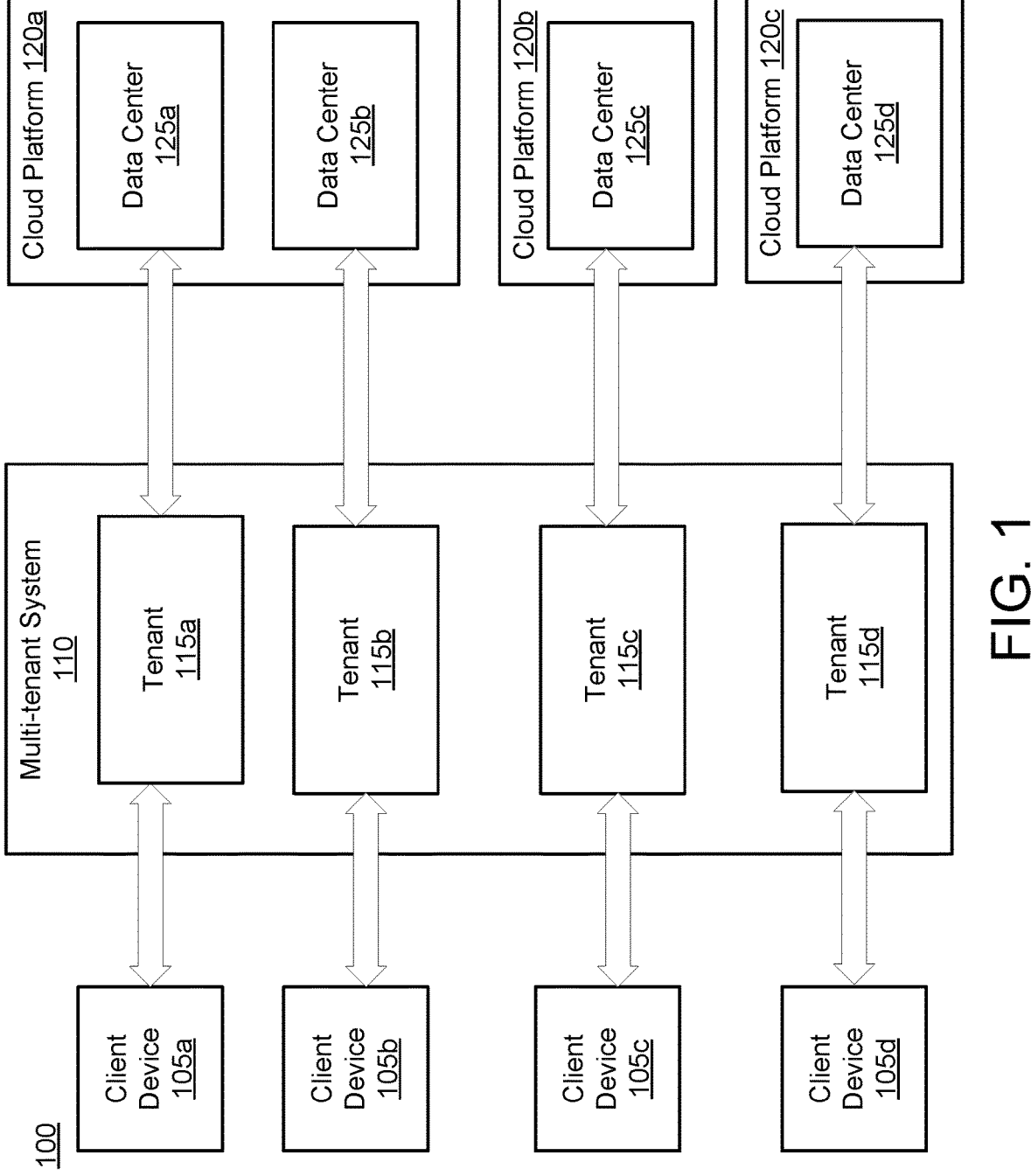
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, migrating a service from a first party datacenter to a data center configured on a public cloud platform increases the risk exposure of the service. As a result, a security assessment is required for the service in the new environment to which the service is being migrated. Security assessment can be a slow and cumbersome process that requires several steps and experts.

The system according to various embodiments performs security assessment of a service by determining a risk profile of the service and using information of services with known security assessments. The system may perform security assessment of existing services that are migrating to a new environment or platform as well as for new services that are being installed in the new environment.

According to an embodiment, the system performs security assessment of a service based on clustering of risk profiles of known services. The system receives information describing risk profiles of a plurality of services, wherein information describing risk profile of a particular service comprises a set of features of the particular service and a security assessment category of the particular service. The system performs clustering of the services of the plurality of services to obtain a plurality of clusters of services. A cluster of service is associated with a security assessment category. The system uses the clusters of services for determining security assessment categories for new services. For example, the system receives information describing a service for deploying in a cloud platform. The system extracts features describing a risk profile of the service. The system identifies a cluster of services matching the features of the service from the plurality of clusters of services and determines a security assessment category for the service based on the identified cluster of services. The system performs an action associated with deployment of the service on the cloud platform based on the security assessment category.

According to an embodiment, the system predicts security assessment of a service based on machine learning model. The system receives training data based on a plurality of services. The training data for a service includes a set of features of the service and a security assessment score of the service. The system trains a machine learning model using the training data. The machine learning model is configured to receive features describing an input service and predict a security assessment score for the input service. The system uses the trained machine learning model to predict security assessment of new services. For example, the system receives information describing a service being deployed in a cloud platform. The system extracts a feature vector comprising features describing the service. The system provides the feature vector as input to the machine learning model and executes the machine learning model to predict a security assessment score for the service being deployed on the cloud platform. The system performs an action associated with deployment of the service on the cloud platform based on the security assessment score.

The action associated with deployment of the service on the cloud platform may be providing a recommendation associated with security of the service, for example, whether a firewall should be installed for the service. The action associated with deployment of the service on the cloud platform may be automatically configuring the security of the service, for example, whether configuring a firewall for the service.

Although the techniques disclosed are described in the context of migrating services to cloud platform, the techniques are applicable to performing security assessment of services in any context, for example, for performing security assessment of a new service being deployed in any environment.

System Environment

FIG. 1 is a block diagram of a system environment illustrating a multi-tenant system configuring data centers on cloud platforms according to an embodiment. The system environment 100 comprises a multi-tenant system 110, one or more cloud platforms 120a-120c, and one or more client devices 105a-105d. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105a-105d.

A cloud platform may also be referred to as a cloud computing platform or a public cloud environment. A tenant may use the cloud platform infrastructure language to provide a declarative specification of a datacenter that is created on a target cloud platform 120 and to perform operations using the datacenter, for example, provision resources, perform software releases and so on. A tenant 115 may create one or more data centers on a cloud platform 120. A data center represents a set of computing resources including servers, applications, storage, memory, and so on that can be used by users, for example, users associated with the tenant. Each tenant may offer different functionality to users of the tenant. Accordingly, each tenant may execute different services on the datacenter configured for the tenant. The multi-tenant system may implement different mechanisms for release and deployment of software for each tenant. A tenant may further obtain or develop versions of software that include instructions for various services executing in a datacenter. Embodiments allow the tenant to deploy specific versions of software releases for different services running on different computing resources of the datacenter.

The computing resources of a data center are secure and may not be accessed by users that are not authorized to access them. For example, a data center 125 a that is created for users of tenant 115 a may not be accessed by users of tenant 115 b unless access is explicitly granted. Similarly, data center 125 b that is created for users of tenant 115 b may not be accessed by users of tenant 115 a, unless access is explicitly granted. Likewise, a data center 125 c is created for users of tenant 115 c, and a data center 125 d is created for users of tenant 115 d. Furthermore, services provided by a data center may be accessed by computing systems outside the data center, only if access is granted to the computing systems in accordance with the declarative specification of the data center.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

The multi-tenant system 110 may migrate services from one type of environment to another type of environment. For example, a multi-tenant system 110 may migrate services from first party datacenters to datacenters configured on a cloud platform 120. Moving a service from one environment to another environment causes changes to the risk profile of the service. A risk profile represents attributes of the service that concern security of the service. For example, deploying a service on a public cloud platform may result in higher risk exposure of the service compared to running the service on a first party datacenter that is within the control of the users managing the multi-tenant system. For example, in a public cloud, there is higher likelihood of unauthorized users gaining access to the service or being able to view data processed by the service. The process of migrating a service from first party datacenters to cloud platforms includes performing security assessment of the service. The security assessment determines a likelihood of risk exposure of the service in a particular environment. Depending on the security assessment the multi-tenant system 110 may recommend certain actions to be taken for a particular service. Alternatively, the multi-tenant system 110 may automatically take certain actions to improve the security of the service. For example, the multi-tenant system 110 may recommend installing a firewall for protecting the service or the data processed by the service. Alternatively, the multi-tenant system 110 may automatically configure or install a firewall for protecting the service or the data processed by the service.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2:
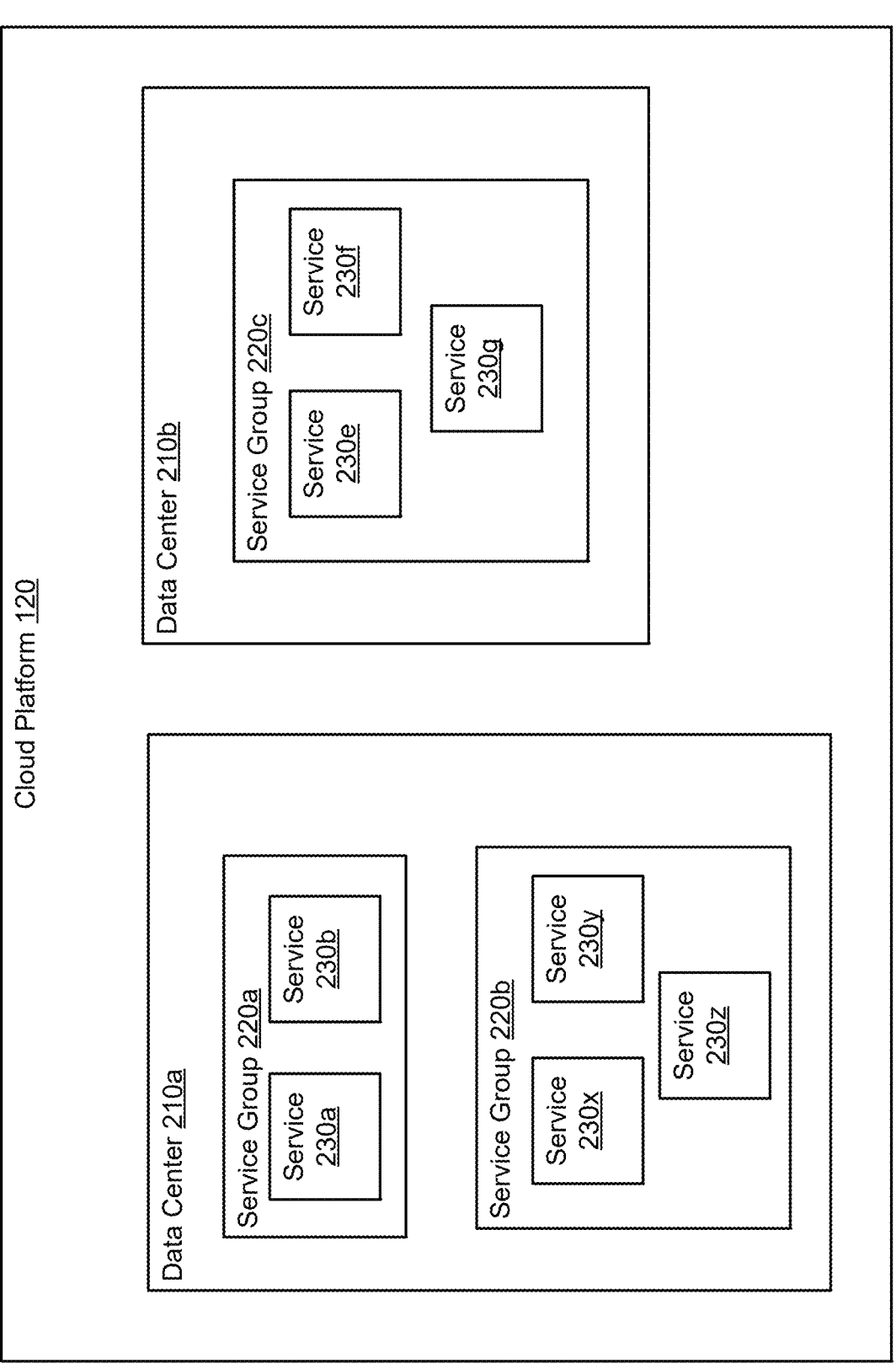
FIG. 2 illustrates some example data centers created on a cloud platform according to an embodiment.

FIG. 2 illustrates some example data centers created on a cloud platform according to an embodiment. As shown in FIG. 2, multiple data centers may be configured within a cloud platform 120. Each data center 210 may correspond to a tenant 115 of a multi-tenant system 110. A tenant 115 may create one or more data centers 210. Alternatively, a data center 210 may be created by any computing system. Each data center includes one or more service groups. For example, data center 210 *a* includes service groups 220 *a* and 220 *b* and data center 210 *b* includes service group 220 *c*. A data center may include multiple instances of a particular type of service group. Each service group includes a set of services. For example, service group 220 *a* includes services 230 *a* and 230 *b*, service group 220 *b* includes services 230 *x*, 230 *y*, and 230 *z*, and service group 220 *c* includes services 230 *e*, 230 *f*, and 230 *g*. A service group may include multiple instances of services of the same service type. An example of a service group is a functional domain. A functional domain (FD) represents a set of capabilities and features and services offered by one or more computing systems that can be built and delivered independently, in accordance with one embodiment. A functional domain may also be viewed a set of cohesive technical use-case functionalities offered by one or more computing systems. A functional domain has strictly enforced security boundaries. A functional domain defines a scope for modifications. Thus, any modifications to an entity-such as a capability, feature, or service-offered by one or more computing systems within a functional domain may propagate as needed or suitable to entities within the functional domain, but will not propagate to an entity residing outside the bounded definition of the functional domain.

The multi-tenant system 110 configures data centers on cloud platforms. The multi-tenant system 110 receives information identifying a target cloud platform for creating the data center based on the cloud platform independent declarative specification. The target cloud platform could be any of a plurality of cloud platforms, for example, AWS, AZURE, GCP, and so on. The multi-tenant system 110 further receives information to connect with the target cloud platform, for example, credentials for creating a connection with the target cloud platform. A cloud platform may also be referred to as a cloud computing platform.

Figure 3:
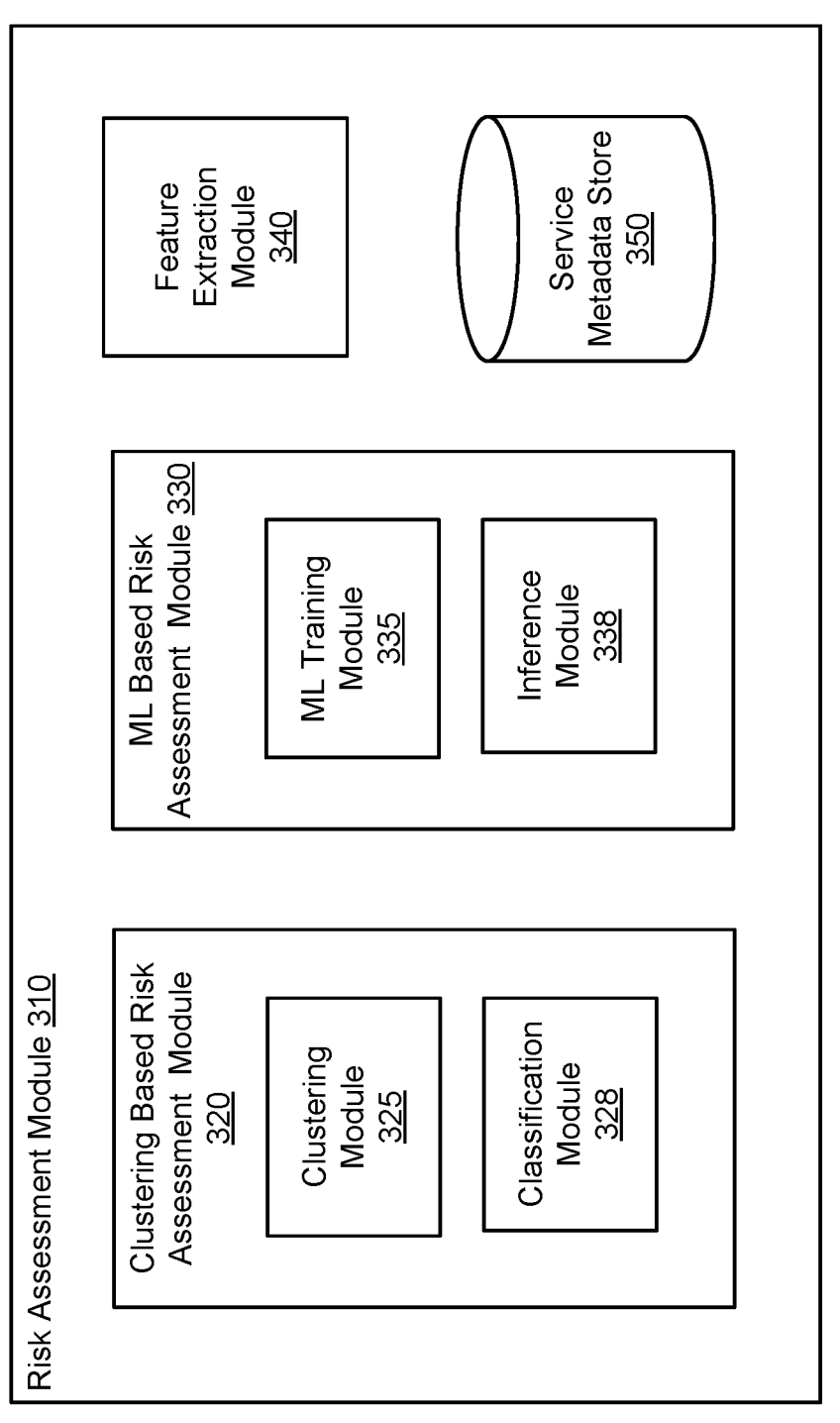
FIG. 3 shows the system architecture of a risk assessment module according to an embodiment.

FIG. 3 shows the system architecture of a risk assessment module according to an embodiment. The risk assessment module 310 may be part of the multi-tenant system 110 or a cloud platform 120. The risk assessment module 310 comprises a clustering based risk assessment module 320, a machine learning based risk assessment module 330, a feature extraction module 340, and a service metadata store 350. Other embodiments may include more or fewer modules than those indicated herein.

The service metadata store 350 stores information describing various services. The information describing a service may be obtained from a user via a client application. Certain type of information describing a service may be obtained by running scripts or by invoking APIs (application programming interfaces) of the service or related applications. The information describing the service is used by the feature extraction module 340 for extracting features of a service.

The metadata of a service represents a risk profile of a service that defines a set of boundaries and configurations of the service as it is deployed in an environment such as the cloud platform 120. The risk profile for a service may include information, for example, whether the service has an internet facing application that allows users to interact with the service, whether the service stores data in a persistent storage such as a database or file system, type of access allowed to a persistent storage used for storing the data of the service, and so on. The risk profile of a service may be determined automatically by the system by accessing various attributes of the service, for example, by using a script with instructions for extracting various attributes describing the service. The risk profile may include attributes representing whether certain security policies are being implemented for the service, for example, policies for performing disaster recovery, archiving, failover, backup, and so on. The risk profile for a service may be obtained from configurations such as network security policy configuration, Layer7 policy configuration, IAM (Identity and Access Management) configuration, AuthZ Policy configuration, and so no. Certain attributes of the risk profile are obtained from users such as service owners via a client application.

The feature extraction module 340 extracts features describing services and stores them as features that are processed by the clustering based risk assessment module 320 and the machine learning based risk assessment module 330. The feature extraction module 340 may represent the features of a service as a feature vector that can be compared to other feature vectors, for example, using a distance metric such as L2 norm. The features describing a service may include various attributes. A feature may represent how auditing is performed for the service, for example, when the service is patched, accessed, or deployed in an environment. A feature may indicate whether compute images for the service are pre-approved images or based on custom builds. A feature may represent the type of user access required for running the service. A feature may represent a type of data processed by the service, for example, whether the data is considered sensitive. A feature may represent whether the service processes data that requires specific type of compliance, for example, GDPR (General Data Protection Regulation) compliance or whether the service processes that that is not-sensitive and does not require specific compliance. An attribute may represent whether the service is stateful i.e., stores data or stateless, i.e., does not store any data. If the service stores data, a feature may represent whether the data stored is encrypted. A feature may represent information describing keys managed for encrypting data processed by the service, for example, whether a key management service is used for managing the keys.

If the service is being deployed in public cloud, some features represent a substrate configuration. For example, a feature may represent information describing access to an account used for managing the service, for example, the number of users that can access the account, type of access control for the account, and so on. Features may represent various access control aspects of the service and data processed by the service including whether multi-factor authentication is required, how often passwords are changed or rotated, whether auditing is performed for login operations, and so on.

Some features may represent a network policy profile of the service. These features may describe the type of network access of the service, whether other services can connect to this service, whether this service can connect to other services. A feature may represent whether communications with the service are encrypted. Some features may represent identity access management profile of the service.

Some features may represent an application profile of the feature, for example, feature describing the image of the service, attributes describing continuous integration/continuous delivery of the service, and so on. A feature may describe how reporting and monitoring is performed for the service.

A feature may describe whether the service is integrated with a vulnerability management system. A feature may describe how secrets are managed for the service, whether the service is integrated with a secrets management system, how secrets are shared, and so on. A feature may describe how certificates are managed for the service.

Figure 4:
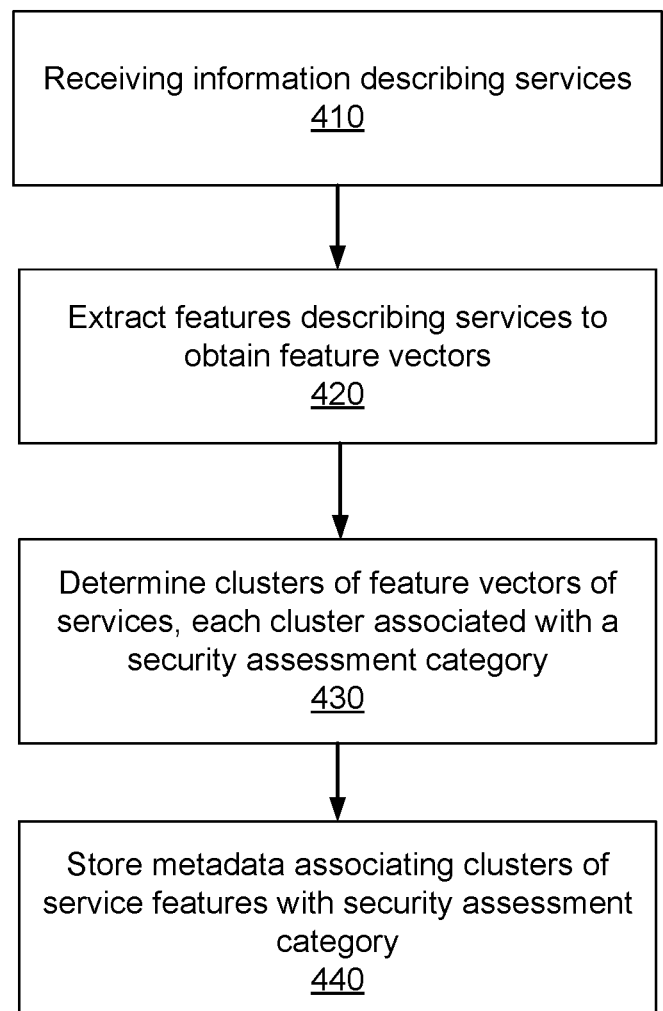
FIG. 4 shows a flowchart illustrating the process of associating clusters of services with security assessment categories according to an embodiment.

The clustering based risk assessment module 320 performs security assessment of services based on clusters of services determined based on services with known security assessment categories. The clustering based risk assessment module 320 includes a clustering module 325 and a classification module 328. The clustering module 325 determines clusters of services, each cluster associated with a category of security assessment for services. The clustering process is illustrated in FIG. 4 and described in connection with FIG. 4. The classification module 328 receives information describing a new service and classifies the service based on the category of security assessment. Examples of security assessment categories include low security service, medium security service, and high security service. According to an embodiment, the security assessment categories represent various tiers of services. For example, Tier0 may represent highly critical services which handles customer data and require lot of scrutiny. Other examples of Tier0 services include cryptographic key management service, PKI services and so on. Similarly there are other tiers such as Tier1, Tier2, Tier3, Tier4 services listed in order of decreasing level of scrutiny required from security perspective. An example of Tier4 is an internal service which performs analytics on the configuration data, and is not exposed to internet. Such services typically do not process and store customer data and are completely sandboxed. For such services it is sufficient to consider software vulnerability of the code in which the service was implementged or the third parties library used.

Figure 5:
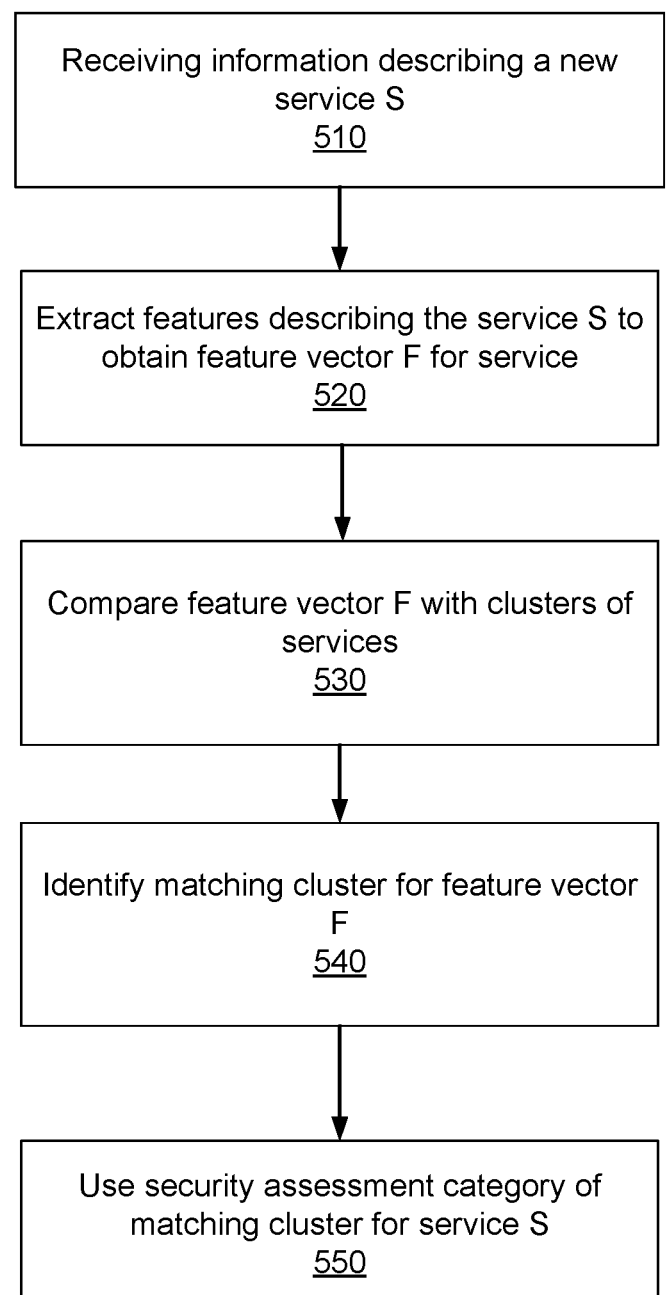
FIG. 5 shows a flowchart illustrating the process of determining security assessment for a service based on clusters of services according to an embodiment.

The classification process is illustrated in FIG. 5 and described in connection with FIG. 5.

The machine learning based risk assessment module 330, performs machine learning based security assessment of a service. The ML based risk assessment module 330 includes an ML training module 355 and an inference module 338. The ML training module 335 performs training of the machine learning model using information describing services with known security assessment. The machine learning model is configured to receive as input features describing a service and predict a security assessment score for the service. The security assessment score can be used to determine a security assessment category for the service. For example, the security assessment score values may be divided into bins, each bin mapping to a security assessment category.

According to an embodiment, the machine learning model is a regression-based model, for example, a linear regression model or a non-linear regression model. According to another embodiment, the machine learning model is a neural network, for example, a multi-layer perceptron.

Figure 6:
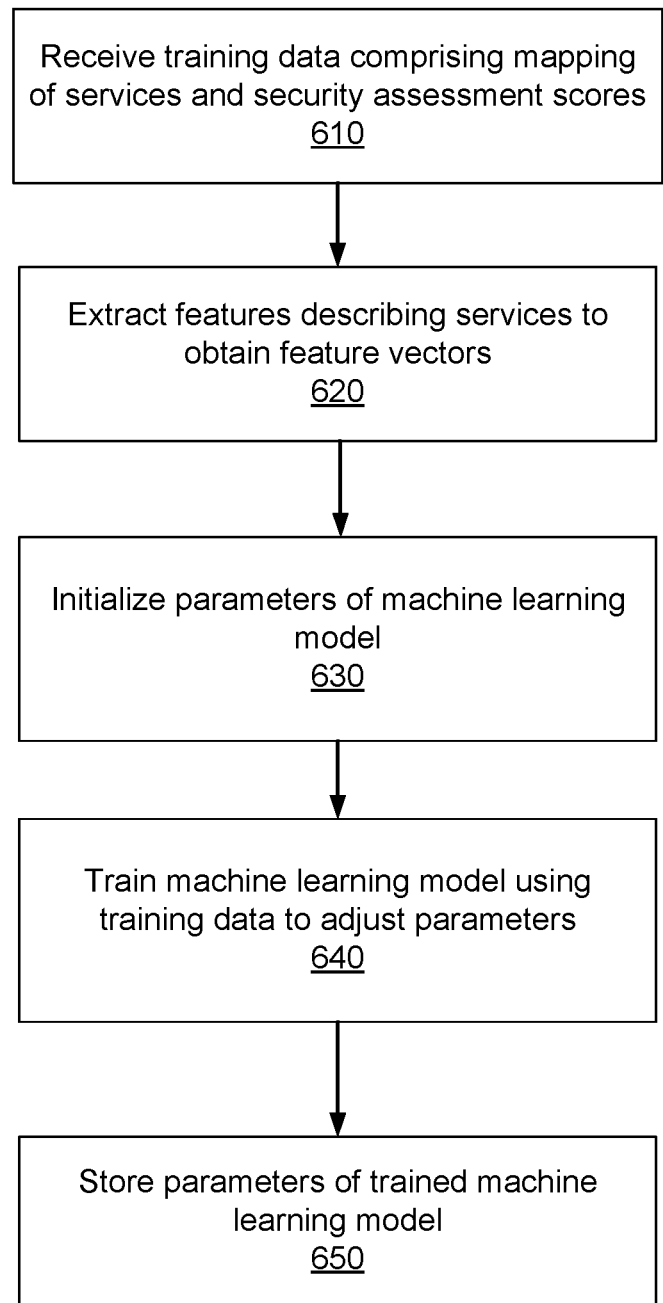
FIG. 6 shows a flowchart illustrating the process of training a machine learning model to predict security assessment score for a service according to an embodiment.

The ML training process is illustrated in FIG. 6 and described in connection with FIG. 4. The inference module 338 executes the trained ML model to predict the security assessment for a new service or a service that is moved from one environment to another environment, thereby changing the features describing the service. The process for determining the security assessment for a service is illustrated in FIG. 7 and described in connection with FIG. 7.

Clustering Based Security Assessment of a Service

FIG. 4 shows a flowchart illustrating the process 400 of associating clusters of services with security assessment categories according to an embodiment.

In step 410, the risk assessment module 310 receives information describing various services with known risk assessment categories. The information may be stored in service metadata store 350. Some of the information may be received from users such as system administrators or service owners via an application.

In step 420, the feature extraction module 340 extracts 420 features describing the various services to obtain features vectors corresponding to the services. The feature extraction module 340 stores the feature vectors in the service metadata store 350. According to an embodiment, the feature vector represents each feature value as a numeric score or any other representation that allows two feature vectors may be compared, for example, based on a distance metric.

In step 430, the clustering module 325 identifies clusters of feature vectors of services. The clustering module 325 determines clusters that minimize a distance between feature vectors of services of each cluster, for example, a distance based on an L2 norm between feature vectors. The clustering module may determine clusters of feature vectors using a clustering technique such as k-means clustering.

The clustering module 325 determines a security assessment category for each cluster of services. Each cluster represents services that have a particular category of security assessment. The clustering based risk assessment module 320 determines aggregate properties of each cluster, for example, an aggregate feature vector for each cluster. The aggregate feature vector for a cluster is used as a representative feature vector for the cluster and may be used for comparing a feature vector of a new service to identify matching cluster for the new service.

The clustering module 325 stores 440 metadata describing each cluster in the service metadata store 350, including the aggregate feature vector of the cluster and the security assessment category of the cluster. The clustering based risk assessment module 320 uses the stored metadata describing the clusters for determining security assessment category for any particular service that is encountered or if the metadata describing a service is changed. The metadata describing a service may change when the service is moved from one environment to another environment, for example, if a service running in first party datacenters of the multi-tenant system is moved to datacenters configured on a cloud platform.

FIG. 5 shows a flowchart illustrating the process 500 of determining security assessment for a service based on clusters of services according to an embodiment. The process may be executed by the classification module 328 of the ML based risk assessment module 330. The classification module 328 receives 510 information describing a new service S. The service S may be a service for which the features have changed, thereby requiring reevaluation of the security assessment of the service. The classification module 328 may invoke the feature extraction module 340 to extract 520 features describing the service S. The features describing the service S may be represented as a feature vector F. In step 530, the classification module 328 compares the feature vector F against the aggregate feature vectors that are representative of the clusters of services. The classification module 328 may determine a distance metric between the feature vector F and aggregate feature vector for a cluster of services. The classification module 328 compares the distance metrics determined for the different clusters of services to identify 540 a matching cluster of services for the new service F. The matching cluster may be the cluster of services that is nearest to the service S based on the distance metric, i.e., the cluster of service that has a representative feature vector that has the minimum distance from the feature vector F of the service S. In step 550, the classification module 328 uses the security assessment category of the matching cluster as the security assessment category of the new service S. The risk assessment module 310 provides the security assessment category for display via a user interface of a client application.

Machine Learning Based Security Assessment of a Service

FIG. 6 shows a flowchart illustrating the process 600 of training a machine learning model to predict security assessment score for a service according to an embodiment. The ML training module 335 receives 610 training data comprising mappings of services and security assessment scores. The mapping of services and security assessment scores may be provided by users, for example, service owners based on past configuration used for services. The security assessment for services may be provided as categories of security assessments. The ML training module 335 may map categories of security assessments to security assessment score values. For example, each category of security assessment may be associated with a range of security assessment score values. The ML training module 335 uses a value from the range of security assessment score values for as the security assessment score for a service based on the security assessment category assigned to the service.

The ML training module 335 may invoke the feature extraction module 340 to extract 620 features describing services. The features describing the services are used to generate a feature vector for the service that may comprise an array of values, each value representing a feature value.

The ML training module 335 initializes 630 the parameters of the machine learning model. The ML training module 335 may initialize the parameters of the machine learning model to randomly assigned values. Alternatively, the ML training module 335 may initialize the parameters using parameters of a pretrained machine learning model. For example, a pretrained machine learning model for a tenant of the multi-tenant system may represent a machine learning model trained using service data from other tenants.

The ML training module 335 trains 640 the machine learning model using the training data. The training process adjusts the parameters of the machine learning model, for example, using gradient descent to minimize the different between predicted security assessment scores for the services in the training data and labels representing actual values of security assessment scores assigned by users. The ML training module 335 stores 650 the parameters of the trained machine learning model.

FIG. 7 shows a flowchart illustrating the process 700 of determining security assessment for a service based on machine learning models according to an embodiment. In step 710, the inference module 338 receives information describing a new service S for which security assessment needs to be analyzed. In step 720, the inference module 338 may invoke the feature extraction module 340 to extract features of the new service S. In step 730, the features of the new service may be represented as a feature vector F. The inference module 338 accesses the training machine learning model and provides 730 the feature vector F as input to the trained machine learning model. In step 740, the inference module 338 executes the trained machine learning model to predicts a security assessment score for the service S. In step 750, the based risk assessment module 330 may determine a security assessment category for the service based on the security assessment score. The risk assessment module 310 provides the security assessment category for display via a user interface of a client application.

Computer Architecture

Figure 8:
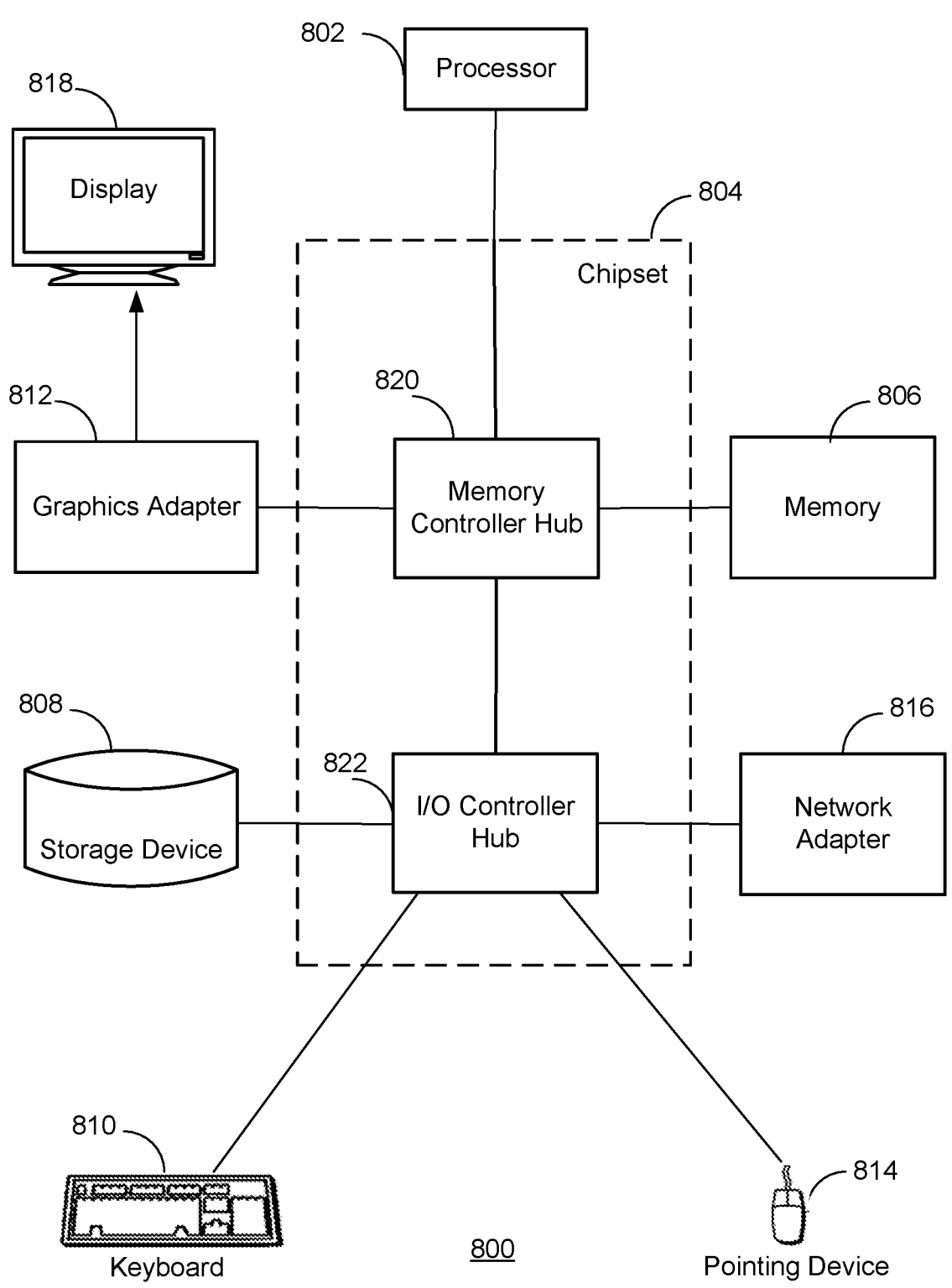
FIG. 8 is a high-level block diagram illustrating a functional view of a typical computer system for use as one of the entities illustrated in the environment 100 of FIG. 1 according to an embodiment.

FIG. 8 is a high-level block diagram illustrating a functional view of a typical computer system for use as one of the entities illustrated in the environment 100 of FIG. 1 according to an embodiment. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is a non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 200. The graphics adapter 812 displays images and other information on the display 818. The network adapter 816 couples the computer system 800 to a network.

As is known in the art, a computer 800 can have different and/or other components than those shown in FIG. 8. In addition, the computer 800 can lack certain illustrated components. For example, a computer system 800 acting as a multi-tenant system 110 may lack a keyboard 810 and a pointing device 814. Moreover, the storage device 808 can be local and/or remote from the computer 800 (such as embodied within a storage area network (SAN)).

The computer 800 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 808, loaded into the memory 806, and executed by the processor 802.

The types of computer systems 800 used by the entities of a system environment can vary depending upon the embodiment and the processing power used by the entity. For example, a client device may be a mobile phone with limited processing power, a small display 818, and may lack a pointing device 814. A multi-tenant system or a cloud platform, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer implemented method for security assessment of services being deployed on a cloud platform, the method comprising:

instantiate a machine learning model, trained using training data received based on a plurality of services, the training data for a service comprising a set of features of the service and a security assessment score of the service, the machine learning model configured to receive features describing an input service and predict a security assessment score for the input service;

receiving information describing a service being deployed in a cloud platform, the information including whether the service is user-accessible, and whether the service stores data of users using the service;

extracting a feature vector from the received information comprising features describing the service;

providing the feature vector as input to the machine learning model;

executing the machine learning model to predict a security assessment score for the service being deployed on the cloud platform;

assigning the service to one of a plurality of different security assessment categories based on the security assessment score; and performing an action associated with deployment of the service on the cloud platform based on the security assessment category of the service.

2. The computer implemented method of claim 1, wherein the action represents sending a recommendation describing security aspects of the service deployed on the cloud platform.

3. The computer implemented method of claim 2, wherein the action represents configuring one or more security aspects of the service deployed on the cloud platform.

4. The computer implemented method of claim 1, wherein a feature represents an attribute extracted from a substrate configuration of the cloud platform.

5. The computer implemented method of claim 1, wherein a feature represents an attribute describing network security of the service as deployed on the cloud platform.

6. The computer implemented method of claim 1, wherein the service is being migrated from a first party datacenter to a datacenter configured on the cloud platform.

7. The computer implemented method of claim 1, further comprising:

clustering a plurality of services into one of the plurality of different security assessment categories;

calculating a feature vector for the cluster based on determined aggregate properties of the plurality of services contained within the one of the plurality of different security assessment categories;

compare the feature vector to a new service; and categorizing the new service based on the comparison.

8. A computer implemented method for security assessment of services being deployed on a cloud platform, the method comprising:

receiving information describing risk profiles of a plurality of services, wherein information describing risk profile of a particular service comprises a set of features of the particular service and a security assessment category of the particular service;

clustering the services of the plurality of services to obtain a plurality of clusters of services, wherein a cluster of service is associated with a security assessment category;

receiving information describing a service for deploying in a cloud platform, the information including whether the service is user-accessible, and whether the service stores data of users using the service;

extracting features from the received information describing a risk profile of the service;

identifying a cluster of services matching the features of the service from the plurality of clusters of services;

executing a machine learning model to predict a security assessment score for the cluster of services;

assigning the cluster of services to one of a plurality of different security assessment categories based on the security assessment score; and performing an action associated with deployment of the service on the cloud platform based on the security assessment category.

9. The computer implemented method of claim 8, wherein the action represents sending a recommendation describing security aspects of the service deployed on the cloud platform.

10. The computer implemented method of claim 9, wherein the action represents configuring one or more security aspects of the service deployed on the cloud platform.

11. The computer implemented method of claim 8, further comprising:

for each service of the plurality of services, determining a feature vector comprising features of the service, wherein clustering the services of the plurality of services minimizes a distance between feature vectors of services of each cluster.

12. The computer implemented method of claim 8, wherein a feature represents an attribute extracted from a substrate configuration of the cloud platform.

13. The computer implemented method of claim 8, wherein a feature represents an attribute describing network security of the service as deployed on the cloud platform.

14. The computer implemented method of claim 8, wherein the service is being migrated from a first party datacenter to a datacenter configured on the cloud platform.

15. A non-transitory computer readable storage medium for storing instructions that when executed by one or more computer processors cause the one or more computer processors to perform steps comprising:

instantiating a machine learning model, trained using training data received based on a plurality of services, the training data for a service comprising a set of features of the service and a security assessment score of the service;

the machine learning model configured to receive features describing an input service and predict a security assessment score for the input service;

receiving information describing a service being deployed in a cloud platform, the information including whether the service is user-accessible, and whether the service stores data of users using the service;

extracting a feature vector from the received information comprising features describing the service;

providing the feature vector as input to the machine learning model;

executing the machine learning model to predict a security assessment score for the service being deployed on the cloud platform;

assigning the service to one of a plurality of different security assessment categories based on the security assessment score; and performing an action associated with deployment of the service on the cloud platform based on the security assessment category of the service.

16. The non-transitory computer readable storage medium of claim 15, wherein the action represents sending a recommendation describing security aspects of the service deployed on the cloud platform.

17. The non-transitory computer readable storage medium of claim 15, wherein the action represents configuring one or more security aspects of the service deployed on the cloud platform.

18. The non-transitory computer readable storage medium of claim 15, wherein the machine learning model is a neural network.

19. The non-transitory computer readable storage medium of claim 15, wherein a feature represents an attribute extracted from a substrate configuration of the cloud platform.

20. The non-transitory computer readable storage medium of claim 15, wherein a feature represents an attribute describing network security of the service as deployed on the cloud platform.

* * * * *